US011634208B2

(12) United States Patent
Zhang et al.

(10) Patent No.: US 11,634,208 B2
(45) Date of Patent: Apr. 25, 2023

(54) RIGID-FLEXIBLE COUPLED UAV MORPHING WING AND ADDITIVE MANUFACTURING METHOD THEREOF

(71) Applicant: Jilin University, Jilin (CN)

(72) Inventors: Zhihui Zhang, Jilin (CN); Zhenglei Yu, Jilin (CN); Xiaolong Zhang, Jilin (CN); Wei Yan, Jilin (CN); Yanlong Shao, Jilin (CN); Yunhong Liang, Jilin (CN); Qingping Liu, Jilin (CN); Qingquan Zhang, Jilin (CN); Yuting Liu, Jilin (CN)

(73) Assignee: Jilin University, Changchun (CN)

( * ) Notice: Subject to any disclaimer, the term of this patent is extended or adjusted under 35 U.S.C. 154(b) by 303 days.

(21) Appl. No.: 16/924,812

(22) Filed: Jul. 9, 2020

(65) Prior Publication Data

US 2021/0061460 A1    Mar. 4, 2021

(30) Foreign Application Priority Data

Sep. 4, 2019    (CN) .......................... 201910829718.4

(51) Int. Cl.
*B64C 3/38* (2006.01)
*B33Y 10/00* (2015.01)
(Continued)

(52) U.S. Cl.
CPC .............. *B64C 3/38* (2013.01); *B29C 64/118* (2017.08); *B29C 64/393* (2017.08); *B33Y 10/00* (2014.12);
(Continued)

(58) Field of Classification Search
CPC ....... B64C 3/38; B64C 39/003; B64C 39/024; B33Y 10/00; B33Y 50/02; B33Y 70/00; B33Y 80/00; B29C 64/118; B29C 64/393
See application file for complete search history.

(56) References Cited

U.S. PATENT DOCUMENTS 6,165,406 A  * 12/2000  Jang ................... G05B 19/4099
                                                          425/375
7,798,443 B2 *  9/2010  Hamilton ................. B64C 3/38
                                                           244/99.8
(Continued)

FOREIGN PATENT DOCUMENTS

CN       101367433 A    2/2009
CN       104379445 A    2/2015

*Primary Examiner* — Michael H Wang
(74) *Attorney, Agent, or Firm* — ArentFox Schiff LLP; Michael Fainberg (57) ABSTRACT

A rigid-flexible coupled unmanned aerial vehicle (UAV) morphing wing and an additive manufacturing method thereof are disclosed. A shape memory alloy (SMA) strip/wire for controlling the wing upward deformation and an SMA strip/wire for controlling the wing downward deformation are arranged alternately, and a plurality of reinforcing ribs are arranged at intervals on the SMA strips/wires for controlling the wing upward deformation and the SMA strips/wires for controlling the wing downward deformation. The SMA strips/wires for controlling the wing upward deformation and the SMA strips/wires for controlling the wing downward deformation are arranged on a flexible substrate, and are wrapped with an insulating covering. The SMA strips/wires for controlling the wing upward deformation and the SMA strips/wires for controlling the wing downward deformation each are provided with an electric heating element.

4 Claims, 5 Drawing Sheets

(51) Int. Cl.
  *B33Y 50/02*    (2015.01)
  *B33Y 70/00*    (2020.01)
  *B33Y 80/00*    (2015.01)
  *B29C 64/118*   (2017.01)
  *B29C 64/393*   (2017.01)
  *B64C 3/18*     (2006.01)
  *B64C 39/00*    (2023.01)
  *B64C 39/02*    (2023.01)
  *B29L 31/30*    (2006.01)
  *B64U 10/40*    (2023.01)
  *B64U 30/12*    (2023.01)

(52) U.S. Cl.
  CPC ............... *B33Y 50/02* (2014.12); *B33Y 70/00* (2014.12); *B33Y 80/00* (2014.12); *B64C 3/187* (2013.01); *B64C 39/003* (2013.01); *B64C 39/024* (2013.01); *B29L 2031/3085* (2013.01); *B64U 10/40* (2023.01); *B64U 30/12* (2023.01)

(56) References Cited

U.S. PATENT DOCUMENTS

| | | | |
|---|---|---|---|
| 2004/0245393 A1* | 12/2004 | Ifju | A63H 27/007 244/123.1 |
| 2007/0120011 A1* | 5/2007 | Schultz | F01D 5/145 244/99.2 |
| 2015/0047337 A1* | 2/2015 | Gandhi | B64C 3/546 60/527 |
| 2016/0068257 A1* | 3/2016 | Sharma | B64C 21/08 244/99.8 |
| 2017/0305525 A1* | 10/2017 | Xi | B64C 3/385 |
| 2018/0371920 A1* | 12/2018 | Packer | F01D 5/147 |
| 2020/0339242 A1* | 10/2020 | Tsuruta | F03G 7/065 |

\* cited by examiner

RIGID-FLEXIBLE COUPLED UAV MORPHING WING AND ADDITIVE MANUFACTURING METHOD THEREOF

CROSS-REFERENCE TO RELATED APPLICATIONS

This application claims priority to Chinese Patent Application No. 201910829718.4 filed on Sep. 4, 2019, the entire contents of which is hereby incorporated by reference.

TECHNICAL FIELD

The present invention relates to the field of unmanned aerial vehicle (UAV), and in particular, to a rigid-flexible coupled UAV morphing wing and an additive manufacturing method thereof.

BACKGROUND

With the increasing demand for performance and flexibility of UAVs in various environments, the research of intelligent morphing wings has become one of the current hot topics. At present, the research on intelligent morphing wings is in its infancy, and there is no uniform understanding of some concepts and key issues of the intelligent morphing wings in the field of aircraft.

Inspired by bird flight, the design of intelligent morphing wings uses intelligent materials, aerodynamics, structural design, elastic mechanics, bionics, and modern control technologies to achieve changeable aerodynamic configuration and physical structure of UAV, to enhance the adaptability to various flight environments and missions. The wings have better aerodynamic characteristics by changing the wingspan, shape and structure of the wings. With intelligent materials and mechanical deformation structures, the morphing wing technology can well improve the UAV performance, enabling the UAV aircraft to work adaptively under many flight conditions. This will be the future development trend of the new generation UAV.

The rigid-flexible coupled UAV morphing wing is designed based on the structural characteristics of bird wings: (1) Use high-strength shape memory materials to form a high-strength skeleton, and use low-strength shape memory materials to fill the wing to form a rigid-flexible coupled UAV morphing wing structure. (2) Use the deformation characteristic of the shape memory materials to control the up-and-down and back-and-forth deformation of the morphing, and the up-and-down deformation of the wingtip.

Additive manufacturing is a technology of directly manufacturing products through layer-by-layer stacking by using various materials, such as metal, non-metal, and medical biomaterials. The additive manufacturing technology has been widely used in aerospace, medical, automotive, and many other fields. The processing of traditional metal parts generally involves many processes, costly molds and a long design and manufacturing cycle, which cannot meet the manufacturing requirements of new-type UAV morphing wings. Therefore, this method uses additive manufacturing to manufacture the UAV morphing wing to achieve the rigid-flexible coupling and deformation characteristics.

At present, many researchers have conducted research on intelligent morphing wings. For example, Chinese patent CN104379445A discloses a morphing wing with a camber-variable trailing edge and a deformation method, to change the camber of the wing by controlling the upper and lower thermally-actuated members having different coefficients of thermal expansion to expand or shrink through ambient temperature changes. However, the thermally-actuated members are metals with a coefficient of linear thermal expansion such as aluminum. Memory alloy springs are also used to drive up-and-down deformation in the prior art. For example, patent CN101367433A proposes a method to achieve the wing deformation by adding memory alloy springs and shape memory alloy (SMA) springs in the middle of the wing to adjust the section plane changes of the wing. However, like other methods, the deformation mode is simple, the amplitude is small, and the parts are complicated. Therefore, the rigid-flexible coupled UAV morphing wing composed of shape memory materials with different strengths is more conducive to the wing control and deformation. In addition, the additive manufacturing method can effectively improve the fabrication efficiency of the morphing wing. This is of great significance for the research and development of new generation UAVs.

SUMMARY

The present invention is intended to solve the problem of uncontrollable deformation of UAV morphing wings. The present invention uses a high-strength shape memory material to form a high-strength skeleton, and uses a low-strength shape memory material to fill the wing to form a rigid-flexible coupled UAV morphing wing structure; uses a deformation characteristic of the shape memory material to control the up-and-down and back-and-forth deformation of the morphing wing and the up-and-down deformation of a wingtip; and uses the additive manufacturing technology to fabricate the morphing wing, solving the shortcomings of the prior art.

A rigid-flexible coupled UAV morphing wing includes SMA strips/wires for controlling the wing upward deformation, SMA strips/wires for controlling the wing downward deformation, reinforcing ribs, a flexible substrate, and an insulating covering. The SMA strips/wires for controlling the wing upward deformation and the SMA strips/wires for controlling the wing downward deformation are arranged alternately, and a plurality of reinforcing ribs are arranged at intervals on the SMA strips/wires for controlling the wing upward deformation and the SMA strips/wires for controlling the wing downward deformation. The SMA strips/wires for controlling the wing upward deformation and the SMA strips/wires for controlling the wing downward deformation are arranged on the flexible substrate, and are wrapped with the insulating covering.

The SMA strips/wires for controlling the wing upward deformation and the SMA strips/wires for controlling the wing downward deformation each are provided with an electric heating element. The electric heating element may be an electric heating wire or carbon fiber.

The SMA is nickel titanium alloy.

A material of the flexible substrate is polyetheretherketone.

A polymer material is polyetheretherketone.

The deformation principle of the rigid-flexible coupled UAV morphing wing is as follows:

The interlacedly-arranged SMA strips/wires for controlling the wing upward deformation are electrified to deform upwards, driving the wing to deform upwards. The interlacedly-arranged SMA strips/wires for controlling the wing downward deformation are electrified to deform downwards, restoring the wing to the original state. Conversely, the SMA strips/wires for controlling the wing downward deformation, and then the SMA strips/wires for controlling the wing upward deformation are electrically excited to drive the wing to deform downwards and recover.

The wing can be driven to deform up and down by 30° through current excitation. According to the required deformation effect, the wing is controlled to deform up and down with a required angle through current regulation.

A rigid-flexible coupled UAV morphing wing includes SMA strips/wires for controlling the wing upward deformation, SMA strips/wires for controlling the wing downward deformation, reinforcing ribs, a flexible substrate, an insulating covering, an SMA polymer composite strip for controlling the wingtip downward deformation, an SMA polymer composite strip for controlling the wingtip upward deformation, SMA springs for controlling the wing backward deformation, and SMA springs for controlling the wing forward deformation.

The SMA strips/wires for controlling the wing upward deformation and SMA strip/wire for controlling the wing downward deformation are arranged alternately, and a plurality of reinforcing ribs are arranged at intervals on the SMA strips/wires for controlling the wing upward deformation and the SMA strips/wires for controlling the wing downward deformation. The SMA strips/wires for controlling the wing upward deformation and the SMA strips/wires for controlling the wing downward deformation are arranged on the flexible substrate, and are wrapped with the insulating covering.

The SMA polymer composite strip for controlling the wingtip downward deformation and SMA polymer composite strip for controlling the wingtip upward deformation are arranged in a flexible substrate of a wingtip, with the SMA polymer composite strip for controlling the wingtip upward deformation on an outer side and the SMA polymer composite strip for controlling the wingtip downward deformation on an inner side. The SMA spring for controlling the wing backward deformation and the SMA spring for controlling the wing forward deformation are arranged alternately, and are located on the flexible substrate. The SMA spring for controlling the wing backward deformation and the SMA spring for controlling the wing forward deformation are connected between two reinforcing ribs located at the wing root.

The SMA strips/wires for controlling the wing upward deformation, the SMA strips/wires for controlling the wing downward deformation, the flexible substrate, the SMA polymer composite strip for controlling the wingtip downward deformation, the SMA polymer composite strip for controlling the wingtip upward deformation, the SMA spring for controlling the wing backward deformation, and the SMA spring for controlling the wing forward deformation each are provided with an electric heating element. The electric heating element may be an electric heating wire or carbon fiber.

The SMA is nickel titanium alloy.

A material of the flexible substrate is polyetheretherketone.

The polymer material is polyetheretherketone.

The deformation principle of the rigid-flexible coupled UAV morphing wing is as follows:

The interlacedly-arranged shape memory alloy strips/wires for controlling the wing upward deformation are electrified to deform upwards, driving the wing to deform upwards. The interlacedly-arranged shape memory alloy strips/wires for controlling the wing downward deformation are electrified to deform downwards, restoring the wing to the original state. Conversely, the SMA strips/wires for controlling the wing downward deformation, and then the SMA strips/wires for controlling the wing upward deformation are electrically excited to drive the wing to deform downwards and recover.

The SMA polymer composite strip for controlling the wingtip downward deformation and the SMA polymer composite strip for controlling the wingtip upward deformation are arranged on the wingtip. One SMA polymer composite strip for controlling the wingtip upward deformation is thermally excited to drive the wingtip to deform upwards, and one SMA polymer composite strip for controlling the wingtip downward deformation is heated to restore the wingtip to the original state. Conversely, the SMA polymer composite strip for controlling the wingtip downward deformation, and then the SMA polymer composite strip for controlling the wingtip upward deformation are thermally excited to drive the wingtip to deform downwards and recover.

The SMA springs for controlling the wing backward deformation and the SMA springs for controlling the wing forward deformation are arranged at the base of the morphing wing. The SMA springs for controlling the wing backward deformation are triggered through current excitation to drive the wing to deform backwards, and the SMA springs for controlling the wing forward deformation are electrically excited to restore the wing to the original state. Conversely, the SMA springs for controlling the wing forward deformation, and then the SMA springs for controlling the wing backward deformation are electrically excited to drive the wing to deform forwards and recover.

The wing can be driven to deform up and down by 30° through current excitation. The wingtip can be driven to deform up and down by 70° through current (or thermal) excitation. The wing can be driven to deform back and forth by 40° through current excitation. According to the required deformation effect, the up-and-down and back-and-forth deformation with a required angle is implemented for the wing through current regulation, and the up-and-down deformation with a required angle is implemented for the wingtip through current regulation.

An additive manufacturing method for a rigid-flexible coupled UAV morphing wing includes the following steps:

a. Build a 3D model of a UAV morphing wing skeleton.

Use computer aided design software to build the 3D model of the UAV morphing wing skeleton.

b. Fabricate a rigid and high-strength SMA skeleton.

b1: Select SMA strips/wires and springs according to a size of the UAV morphing wing model, and train deformation characteristics of the SMA strips/wires and springs through a high-temperature furnace.

c. Build a 3D model of a flexible and low-strength polymer shape memory material substrate.

Use computer-aided design and manufacturing software to build the flexible and low-strength polymer shape memory material filler model and generate an STL file.

d. Perform slicing processing on the flexible and low-strength polymer shape memory material filler model.

Use a computer program to analyze the STL file of the model to generate two-dimensional slices and obtain contour information.

e. Make preparation before printing.

e1: Determine a location of the rigid and high-strength SMA skeleton, and set up the SMA skeleton.

f. Use additive manufacturing to print flexible and low-strength polymer shape memory materials to complete fabricate of the UAV morphing wing.

f1: Use a 3D printing nozzle to print flexible and low-strength polymer shape memory materials on a printing substrate according to a printing path, to form a substrate base.

f2: During the printing process, set up the high-strength SMA skeleton on the substrate base.

f3: Print the flexible and low-strength polymer shape memory materials layer by layer based on the 3D substrate model, to form the UAV morphing wing after cooling and solidification.

In the present invention, fabricate SMA sheets into suitable memory alloy strips/wires according to an up-and-down deformation amplitude and a back-and-forth deformation amplitude of the UAV morphing wing, fix each memory alloy strip/wire in a special fixture, and heat it at 600° C. in a high-temperature furnace for 60 minutes. The memory alloy strips/wires taken out from the high-temperature furnace have a shape memory characteristic after being cooled. If the SMA material is too thick, first place the memory alloy in the high-temperature furnace at a constant temperature of 350° C. for one hour, then fix it in the special fixture, and heat it at 600° C. for 60 minutes. The memory alloy strips/wires taken out from the high-temperature furnace have a shape memory characteristic after being cooled.

Wrap each prepared SMA wire/strip with an insulating or heat-insulating material, so that the SMA wires/strips are separate without transmitting heat to the flexible material. According to the design principle and plan of the UAV morphing wing skeleton, connect the SMA wires/strips that have the same deformation effect in series using a circuit, and then roughly fix the SMA wires/strips on the reinforcing ribs through adhesives, bundling, welding, and bolts.

According to the additive manufacturing requirements of the flexible and low-strength polymer shape memory materials, choose a printing platform for polymer shape memory material additive manufacturing, use additive manufacturing software to slice the imported 3D UAV morphing wing model, and print the polymer materials layer by layer by controlling printing height setting or model design.

Place the SMA wires/strips at corresponding positions of the substrate model by controlling the printing height setting or model design. If the substrate model has reserved grooves, embed the SMA strips/wires into the grooves.

Use the fused deposition modeling method to print the flexible and low-strength polymer shape memory materials layer by layer on the skeleton arranged with the SMA strips/wires and reinforcing ribs according to the substrate model design, to finally form the UAV morphing wing through crystallization.

Advantageous Effects of the Present Invention

The present invention enables the UAV morphing wing to deform up and down, back and forth after power-on.

In the figures, 1. SMA strip/wire for controlling the wing upward deformation, 2. SMA strip/wire for controlling the wing downward deformation, 3. reinforcing rib, 4. flexible substrate, 5. insulating covering, 6. computer-controlled equipment, 7. additive manufacturing platform for polymer shape memory material, 8. prepared shape memory polymer material, 9. SMA skeleton used for fabrication, 10. SMA and polymer composite strip for controlling the wingtip downward deformation, 11. SMA and polymer composite strip for controlling the wingtip upward deformation, 12. SMA spring for controlling the wing backward deformation, and 13. SMA spring for controlling the wing forward deformation.

DETAILED DESCRIPTION

Example 1

Figure 2:
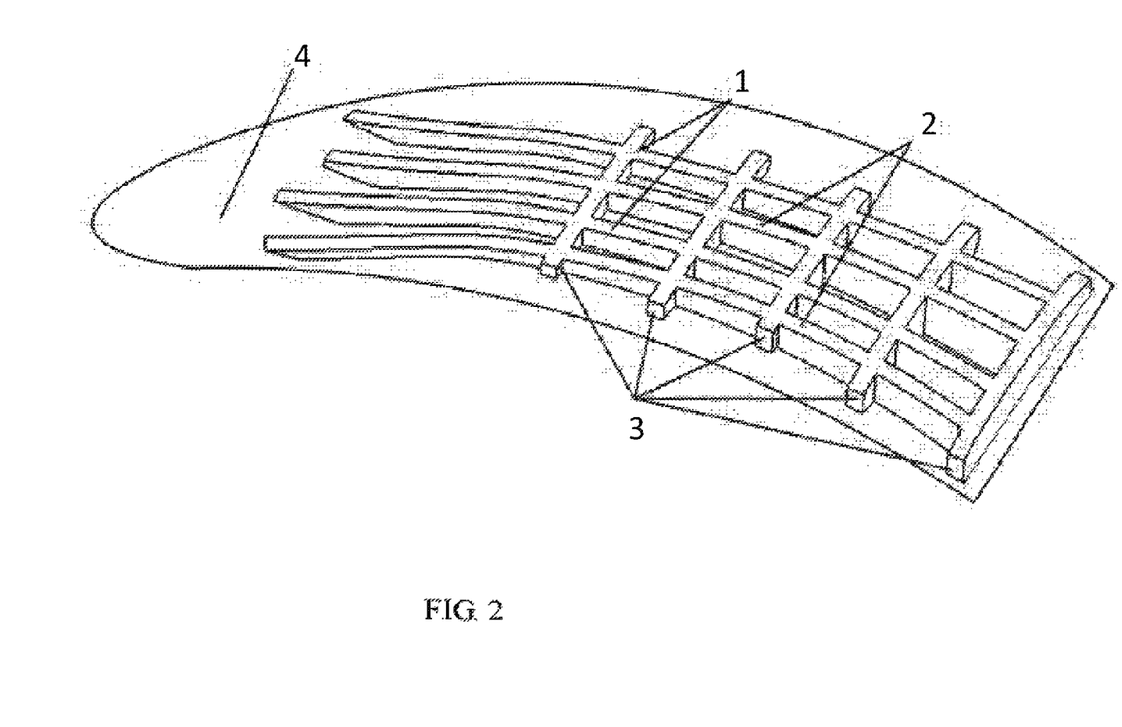
FIG. 2 is a schematic structural view of a first example of a rigid-flexible coupled UAV morphing wing according to the present invention.
Figure 3:
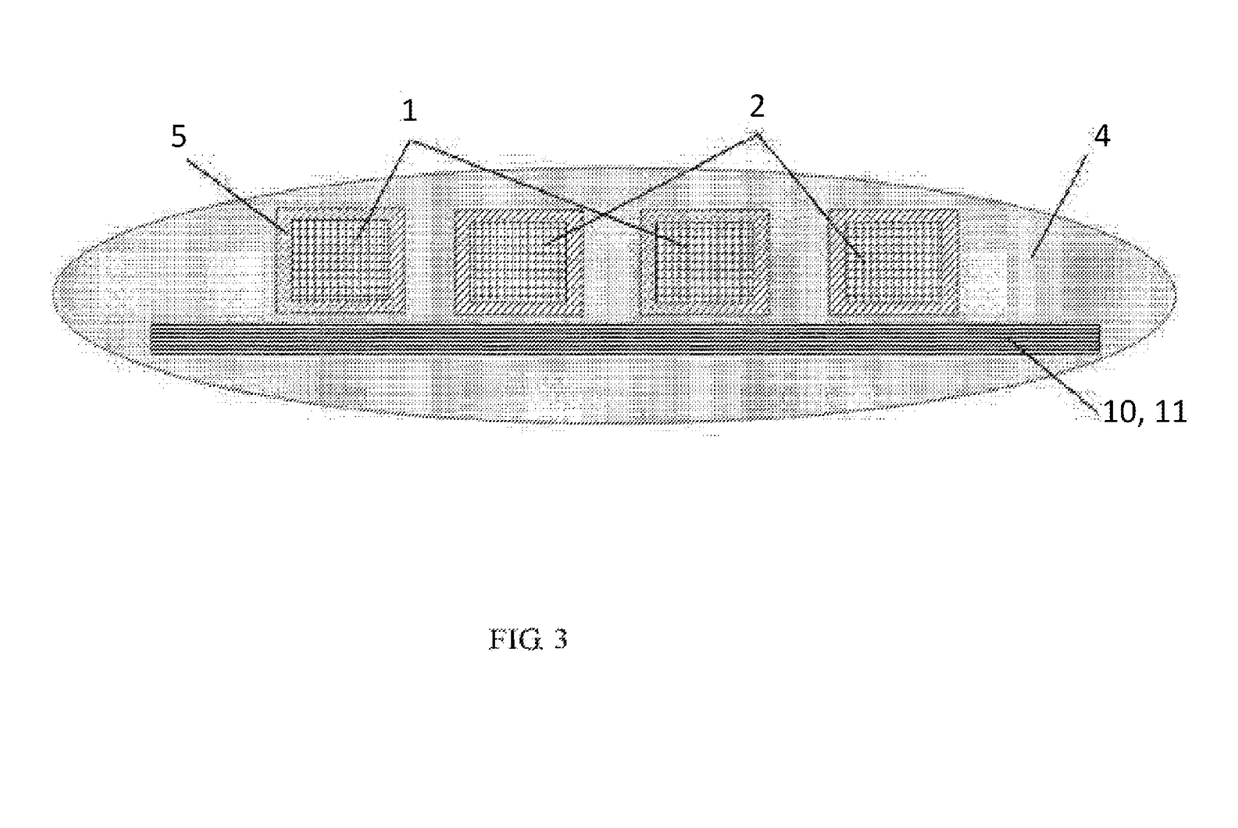
FIG. 3 is a schematic section view of a first example of a rigid-flexible coupled UAV morphing wing according to the present invention.

As shown in FIG. 2 and FIG. 3, a rigid-flexible coupled UAV morphing wing includes SMA strips/wires 1 for controlling the wing upward deformation, SMA strips/wires 2 for controlling the wing downward deformation, reinforcing ribs 3, a flexible substrate 4, and an insulating covering 5. The SMA strips/wires 1 for controlling the wing upward deformation and the SMA strips/wires 2 for controlling the wing downward deformation are arranged alternately, and a plurality of reinforcing ribs 3 are arranged at intervals on the SMA strips/wires 1 for controlling the wing upward deformation and the SMA strips/wires 2 for controlling the wing downward deformation. The SMA strips/wires 1 for controlling the wing upward deformation and the SMA strips/wires 2 for controlling the wing downward deformation are arranged on the flexible substrate 4, and are wrapped with the insulating covering 5.

The SMA strips/wires 1 for controlling the wing upward deformation and the SMA strips/wires 2 for controlling the wing downward deformation each are provided with an electric heating element. The electric heating element may be an electric heating wire or carbon fiber.

The SMA is nickel titanium alloy.

A material of the flexible substrate 4 is polyetheretherketone.

A polymer material is polyetheretherketone.

Deformation Principles in Example 1

The interlacedly-arranged SMA strips/wires 1 for controlling the wing upward deformation are electrified to deform upwards, driving the wing to deform upwards. The interlacedly-arranged SMA strips/wires 2 for controlling the wing downward deformation are electrified to deform downwards, restoring the wing to the original state. Conversely, the SMA strips/wires 2 for controlling the wing downward deformation, and then the SMA strips/wires 1 for controlling the wing upward deformation are electrically excited to drive the wing to deform downwards and recover.

The wing can be driven to deform up and down by 30° through current excitation. According to the required deformation effect, the wing is controlled to deform up and down with a required angle through current regulation.

Example 2

Figure 5:
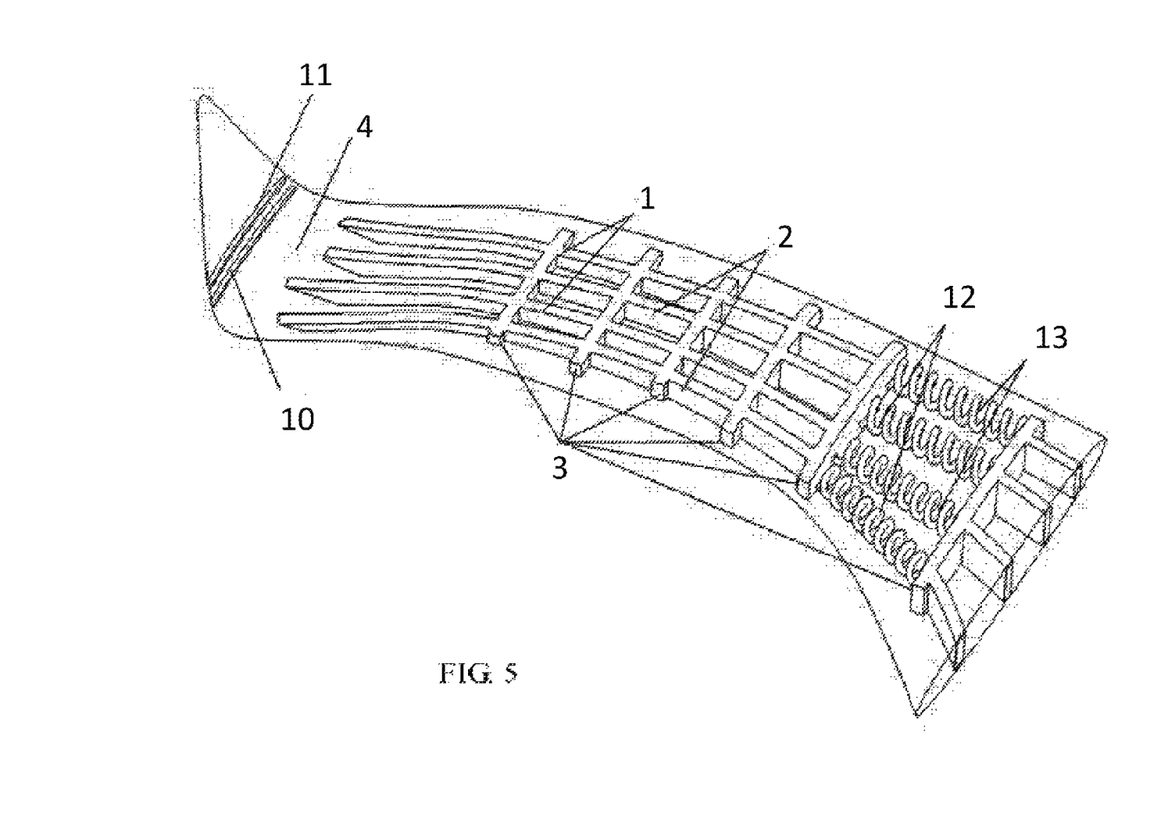
FIG. 5 is a schematic structural view of a second example of a rigid-flexible coupled UAV morphing wing according to the present invention.

As shown in FIG. 3 and FIG. 5, a rigid-flexible coupled UAV morphing wing includes SMA strips/wires 1 for controlling the wing upward deformation, SMA strips/wires 2 for controlling the wing downward deformation, reinforcing ribs 3, a flexible substrate 4, an insulating covering 5, an SMA polymer composite strip 10 for controlling the wingtip downward deformation, an SMA polymer composite strip 11 for controlling the wingtip upward deformation, SMA springs 12 for controlling the wing backward deformation, and SMA springs 13 for controlling the wing forward deformation.

The SMA strips/wires 1 for controlling the wing upward deformation and the SMA strips/wires 2 for controlling the wing downward deformation are arranged alternately, and a plurality of reinforcing ribs 3 are arranged at intervals on the SMA strips/wires 1 for controlling the wing upward deformation and the SMA strips/wires 2 for controlling the wing downward deformation. The SMA strips/wires 1 for controlling the wing upward deformation and the SMA strips/wires 2 for controlling the wing downward deformation are arranged on the flexible substrate 4, and are wrapped with the insulating covering 5.

The SMA polymer composite strip 10 for controlling the wingtip downward deformation and the SMA polymer composite strip 11 for controlling the wingtip upward deformation are arranged in the flexible substrate 4 of an wingtip, with the SMA polymer composite strip 11 for controlling the wingtip upward deformation on an outer side and the SMA polymer composite strip 10 for controlling the wingtip downward deformation on an inner side. The SMA spring 12 for controlling the wing backward deformation and the SMA spring 13 for controlling the wing forward deformation are arranged alternately, and are located on the flexible substrate 4. The SMA spring 12 for controlling the wing backward deformation and the SMA spring 13 for controlling the wing forward deformation are connected between two reinforcing ribs 3 located at the wing root.

The SMA strips/wires 1 for controlling the wing upward deformation, the SMA strips/wires 2 for controlling the wing downward deformation, the flexible substrate 4, the SMA polymer composite strip 10 for controlling the wingtip downward deformation, the SMA polymer composite strip 11 for controlling the wingtip upward deformation, the SMA spring 12 for controlling the wing backward deformation, and the SMA spring 13 for controlling the wing forward deformation each are provided with an electric heating element. The electric heating element may be an electric heating wire or carbon fiber.

The SMA is nickel titanium alloy.

A material of the flexible substrate 4 is polyetheretherketone.

A polymer material is polyetheretherketone.

Deformation Principles in Example 2

The interlacedly-arranged SMA strips/wires 1 for controlling the wing upward deformation are electrified to deform upwards, driving the wing to deform upwards. The interlacedly-arranged SMA strips/wires 2 for controlling the wing downward deformation are electrified to deform downwards, restoring the wing to the original state. Conversely, the SMA strips/wires 2 for controlling the wing downward deformation, and then the SMA strips/wires 1 for controlling the wing upward deformation are electrically excited to drive the wing to deform downwards and recover.

The SMA polymer composite strip 10 for controlling the wingtip downward deformation and the SMA polymer composite strip 11 for controlling the wingtip upward deformation are arranged on the wingtip. One SMA polymer composite strip 11 for controlling the wingtip upward deformation is thermally excited to drive the wingtip to deform upwards, and one SMA polymer composite strip 10 for controlling the wingtip downward deformation is heated to restore the wingtip to the original state. Conversely, the SMA polymer composite strip 10 for controlling the wingtip downward deformation, and then the SMA polymer composite strip 11 for controlling the wingtip upward deformation are thermally excited to drive the wingtip to deform downwards and recover.

The SMA springs 12 for controlling the wing backward deformation and the SMA springs 13 for controlling the wing forward deformation are arranged at the base of the morphing wing. The SMA springs 12 for controlling the wing backward deformation are triggered through current excitation to drive the wing to deform backwards, and the SMA springs 13 for controlling the wing forward deformation are electrically excited to restore the wing to the original state. Conversely, the SMA springs 13 for controlling the wing forward deformation, and then the SMA springs 12 for controlling the wing backward deformation are electrically excited to drive the wing to deform forwards and recover.

The wing can be driven to deform up and down by 30° through current excitation. The wingtip can be driven to deform up and down by 70° through current (or thermal) excitation. The wing can be driven to deform back and forth by 40° through current excitation. According to the required deformation effect, the up-and-down and back-and-forth deformation with a required angle is implemented for the wing through current regulation, and the up-and-down deformation with a required angle is implemented for the wingtip through current regulation.

Figure 1:
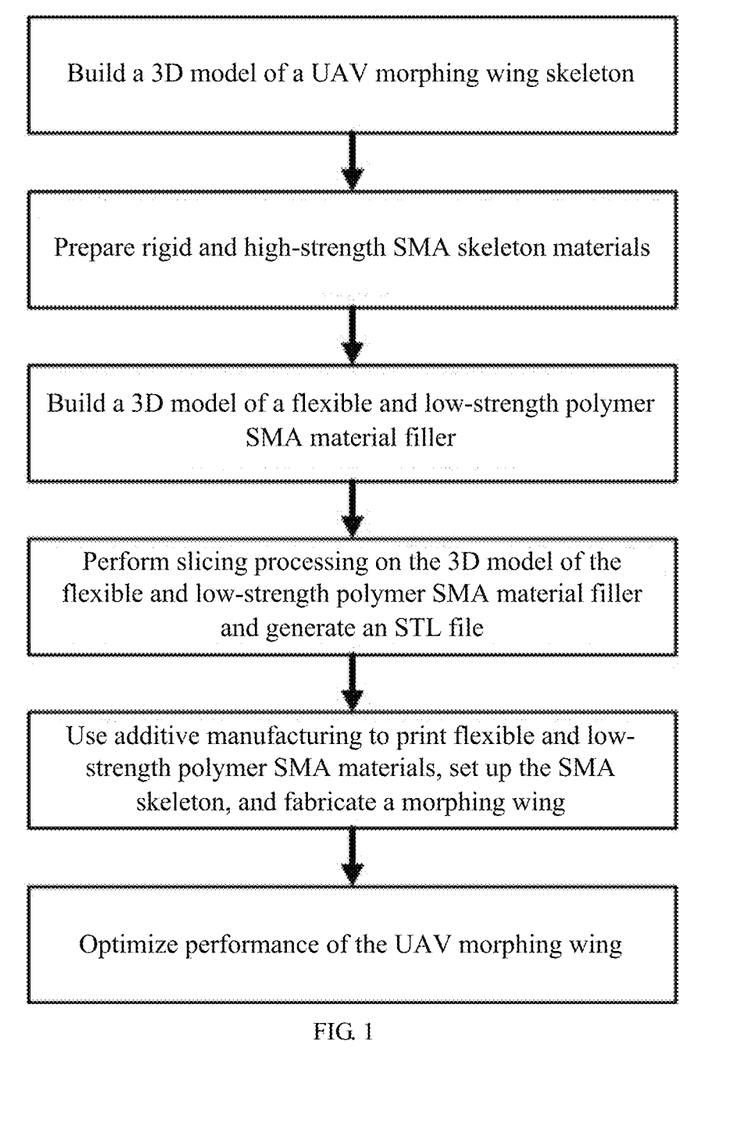
FIG. 1 is a flowchart of an additive manufacturing method according to the present invention.

As shown in FIG. 1, an additive manufacturing method for a rigid-flexible coupled UAV morphing wing includes the following steps:

a. Build a 3D model of a UAV morphing wing skeleton.

Use computer aided design software to build the 3D model of the UAV morphing wing skeleton.

b. Fabricate a rigid and high-strength SMA skeleton.

b1: Select SMA strips/wires and springs according to a size of the UAV morphing wing model, and train deformation characteristics of the SMA strips/wires and springs through a high-temperature furnace.

c. Build a 3D model of a flexible and low-strength polymer shape memory material substrate.

Use computer-aided design and manufacturing software to build the flexible and low-strength polymer shape memory material filler model and generate an STL file.

d. Perform slicing processing on the flexible and low-strength polymer shape memory material filler model.

Use a computer program to analyze the STL file of the model to generate two-dimensional slices and obtain contour information.

e. Make preparation before printing.

e1: Determine a location of the rigid and high-strength SMA skeleton, and set up the SMA skeleton.

f. Use additive manufacturing to print flexible and low-strength polymer shape memory materials to complete fabrication of the UAV morphing wing.

f1: Use a 3D printing nozzle to print the flexible and low-strength polymer shape memory materials on a printing substrate according to a printing path, to form a substrate base.

f2: During the printing process, set up the high-strength SMA skeleton on the substrate base.

f3: Print the flexible and low-strength polymer shape memory materials layer by layer based on the 3D substrate model, to form the UAV morphing wing after cooling and solidification.

In the present invention, fabricate SMA sheets into suitable memory alloy strips/wires according to an up-and-down deformation amplitude and a back-and-forth deformation amplitude of the UAV morphing wing, fix each memory alloy strip/wire in a special fixture, and heat it at 600° C. in a high-temperature furnace for 60 minutes. The memory alloy strips/wires taken out from the high-temperature furnace have a shape memory characteristic after being cooled. If the SMA material is too thick, first place the memory alloy in the high-temperature furnace at a constant temperature of 350° C. for one hour, then fix it in the special fixture, and heat it at 600° C. for 60 minutes. The memory alloy strips/wires taken out from the high-temperature furnace have a shape memory characteristic after being cooled.

Wrap each prepared SMA wire/strip with an insulating or heat-insulating material, so that the SMA wires/strips are separate without transmitting heat to the flexible material. According to the design principle and plan of the UAV morphing wing skeleton, connect the SMA wires/strips that have the same deformation effect in series using a circuit, and then roughly fix the SMA wires/strips on the reinforcing ribs through adhesives, bundling, welding, and bolts.

According to the additive manufacturing requirements of the flexible and low-strength polymer shape memory materials, choose a printing platform for polymer shape memory material additive manufacturing, use additive manufacturing software to slice the imported 3D UAV morphing wing model, and print the polymer materials layer by layer by controlling printing height setting or model design.

Place the SMA wires/strips at corresponding positions of the substrate model by controlling the printing height setting or model design. If the substrate model has reserved grooves, embed the SMA strips/wires into the grooves.

Use the fused deposition modeling method to print the flexible and low-strength polymer shape memory materials layer by layer on the skeleton arranged with the SMA strips/wires and reinforcing ribs according to the substrate model design, to finally form the UAV morphing wing through crystallization.

Specific Example

In this specific example, perform shape memory characteristics training on NiTi shape memory alloy strips and springs at 600° C. to give them the characteristic of bending under when subjected to current. By using a polyether ether ketone (PEEK) shape memory material as a flexible material, print the flexible base according to a 3D printing method that includes global temperature control, local quick cooling, and modification of local printing process parameters. Arrange the NiTi alloy strips and springs on the printed PEEK material, and carry out PEEK material additive manufacturing again, to print a UAV morphing wing through cooling. In this example, a total length of the UAV morphing wing is 200 mm; the NiTi alloy strips are 110 mm long, with a spacing of 15 mm; the NiTi alloy springs are 40 mm long, with an spacing of 22 mm; and a wing tail deformation structure is 20 mm from the wingtip and a spacing of the deformation structure is 5 mm.

The wing fabricated in this specific example can be driven to deform up and down by 30° through current excitation. The wingtip can be driven to deform up and down by 70° through current (or thermal) excitation. The wing can be driven to deform back and forth by 40° through current excitation. According to the required deformation effect, the up-and-down and back-and-forth deformation with a required angle is implemented for the wing through current regulation, and the up-and-down deformation with a required angle is implemented for the wingtip through current regulation.

Figure 4:
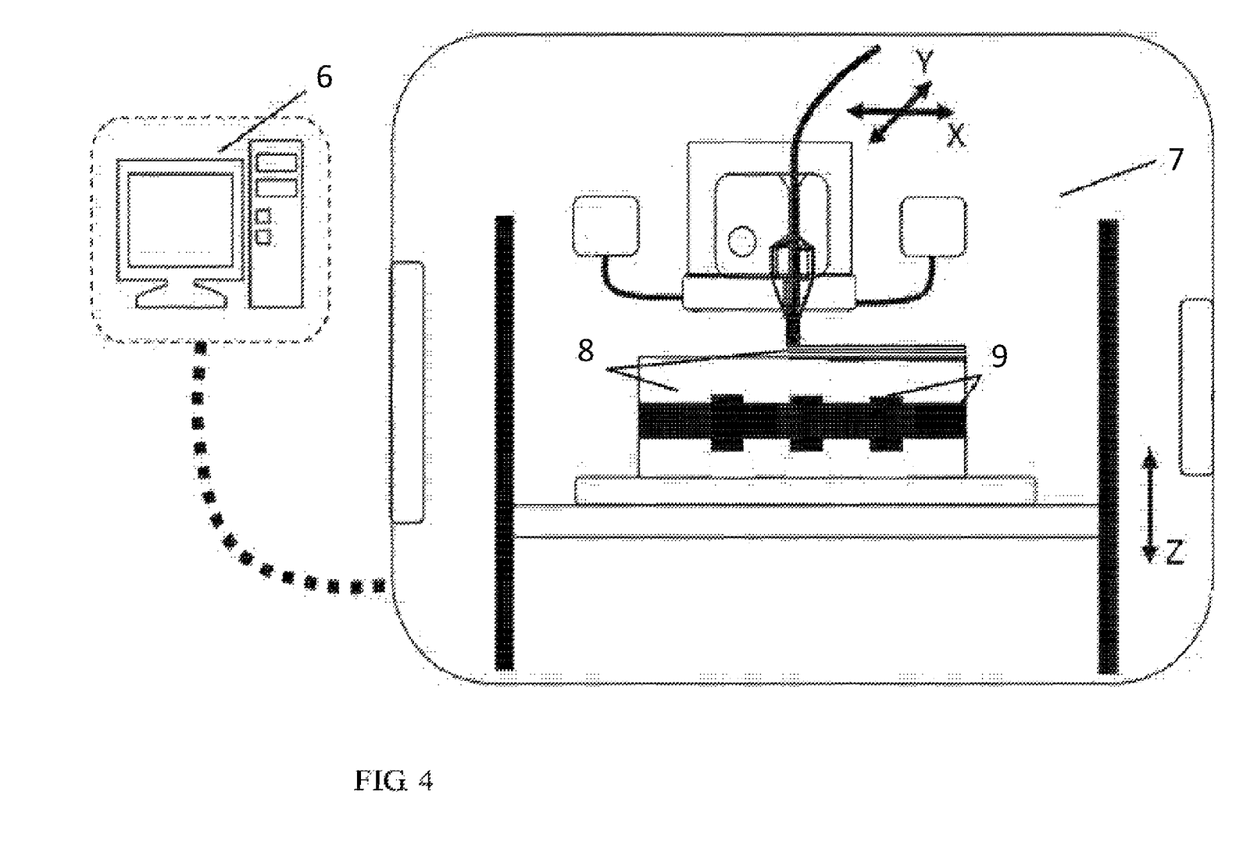
FIG. 4 is a schematic structural diagram of an additive manufacturing device used for the method according to the present invention.

FIG. 4 is a schematic diagram of an additive manufacturing (3D printing) device used for the additive manufacturing method according to the present invention. The additive manufacturing includes a computer-controlled device 6 and an additive manufacturing platform 7 for shape memory polymer materials, where 8 is a shape memory polymer material used for fabrication, and 9 is an SMA skeleton for fabrication.

The invention claimed is:

1. A rigid-flexible coupled UAV morphing wing, comprising SMA strips/wires for controlling the wing upward deformation, SMA strips/wires for controlling the wing downward deformation, reinforcing ribs, a flexible substrate, an insulating covering, an SMA polymer composite strip for controlling the wingtip downward deformation, an SMA polymer composite strip for controlling the wingtip upward deformation, SMA springs for controlling the wing backward deformation, and SMA springs for controlling the wing forward deformation; wherein the SMA strips/wires for controlling the wing upward deformation and the SMA strips/wires for controlling the wing downward deformation are arranged alternately, and a plurality of reinforcing ribs are arranged at intervals on the SMA strips/wires for controlling the wing upward deformation and the SMA strips/wires for controlling the wing downward deformation; the SMA strips/wires for controlling the wing upward deformation and the SMA strips/wires for controlling the wing downward deformation are arranged on the flexible substrate, and are wrapped with the insulating covering;

the SMA polymer composite strip for controlling the wingtip downward deformation and the SMA polymer composite strip for controlling the wingtip upward deformation are arranged in the flexible substrate of an wingtip, with the SMA polymer composite strip for controlling the wingtip upward deformation on an outer side and the SMA polymer composite strip for controlling the wingtip downward deformation on an inner side; the SMA spring for controlling the wing backward deformation and the SMA spring for controlling the wing forward deformation are arranged alternately, and are located on the flexible substrate; the SMA spring for controlling the wing backward deformation and the SMA spring for controlling the wing forward deformation are connected between two reinforcing ribs located at the wing root; and the SMA strips/wires for controlling the wing upward deformation, the SMA strips/wires for controlling the wing downward deformation, the flexible substrate, the SMA polymer composite strip for controlling the wingtip downward deformation, the SMA polymer composite strip for controlling the wingtip upward deformation, the SMA spring for controlling the wing backward deformation, and the SMA spring for controlling the wing forward deformation each are provided with an electric heating element.

2. The rigid-flexible coupled UAV morphing wing according to claim 1, wherein the SMA is nickel titanium alloy.

3. The rigid-flexible coupled UAV morphing wing according to claim 1, wherein a material of the flexible substrate is polyether ether ketone; and a polymer material is polyether ether ketone.

4. An additive manufacturing method for the rigid-flexible coupled UAV morphing wing according to claim 1, comprising the following steps:
- a. building a 3D model of a UAV morphing wing skeleton:
  using computer aided design software to build the 3D model of the UAV morphing wing skeleton;
- b. fabricating a rigid and high-strength SMA skeleton:
- b1: selecting SMA strips/wires and springs according to a size of the UAV morphing wing model, and training deformation characteristics of the SMA strips/wires and springs through a high-temperature furnace;
- c. building a 3D model of a flexible and low-strength polymer shape memory material substrate:
  using computer-aided design and manufacturing software to build the flexible and low-strength polymer shape memory material filler model and generate an STL file;
- d. performing slicing processing on the flexible and low-strength polymer shape memory material filler model:
  using a computer program to analyze the STL file of the model to generate two-dimensional slices and obtain contour information;
- e. making preparation before printing:
- e1: determining a location of the rigid and high-strength SMA skeleton, and setting up the SMA skeleton;
- f. using additive manufacturing to print flexible and low-strength polymer shape memory materials to complete fabrication of the UAV morphing wing:
- f1: using a 3D printing nozzle to print the flexible and low-strength polymer shape memory materials on a printing substrate according to a printing path, to form a substrate base;
- f2: during the printing process, setting up the high-strength SMA skeleton on the substrate base; f3: printing the flexible and low-strength polymer shape memory materials layer by layer
  based on the 3D substrate model, to form the UAV morphing wing after cooling and solidification.

\* \* \* \* \*